March 12, 1940. W. C. CRAWFORD Re. 21,386

PAINT BRUSH HOLDER

Original Filed Nov. 30, 1935

INVENTOR.
Walter C. Crawford
BY
Warren E. Willis.
ATTORNEY.

Reissued Mar. 12, 1940

Re. 21,386

UNITED STATES PATENT OFFICE 21,386

PAINT BRUSH HOLDER

Walter C. Crawford, Bogota, N. J., assignor, by mesne assignments, of one-half to Oscar Olsen and Anthony Pepe, both of Bogota, N. J.

Original No. 2,080,655, dated May 18, 1937, Serial No. 52,284, November 30, 1935. Application for reissue April 28, 1939, Serial No. 270,598

6 Claims. (Cl. 206—15.1)

This invention relates to appliances for maintaining brushes, particularly flat brushes, such as are used in painting, etc., in serviceable condition for immediate reuse.

It is well known that such brushes, when removed from the paint mixture for any considerable length of time, become dry, hard and incapable of conveying and properly distributing paint until after softening the bristles and rendering them pliable.

If the brush is held suspended above the paint container so that the bristles are submerged, such drying condition does not occur, but if left in that manner for a considerable period of time, the volatile elements of the paint will become vaporized, drying and hardening of the bristles then taking place.

In some instances the brushes are removed from the paint and placed in an open receptacle containing a liquid; this will eventually become evaporated and consequently, drying of the bristles ensues; furthermore, unless the brush is suspended from its handle, the bristles become distorted and permanently deformed, both by spreading and bending sidewise to their detriment, even permanent impairment.

One object of the present invention is to provide a brush holder having a series of brush retaining pockets, constructed to permit free circulation of liquid therethrough and to effectively receive and hold brushes without spreading, bending or otherwise distorting or impairing the bristles of said brushes.

Another object is to provide a brush holder comprising a series of brush retaining pockets disposed in an outer container and connected together to form a removable unit, said unit being constructed to prevent substantial play thereof in said container, and to permit its easy entry into said outer container.

Another object is to provide a new and improved brush holder, which is comparatively simple, but nevertheless of practical rugged and durable construction, and which is well suited to meet the requirements of economical manufacture, convenient handling and practical use.

Figure 4:
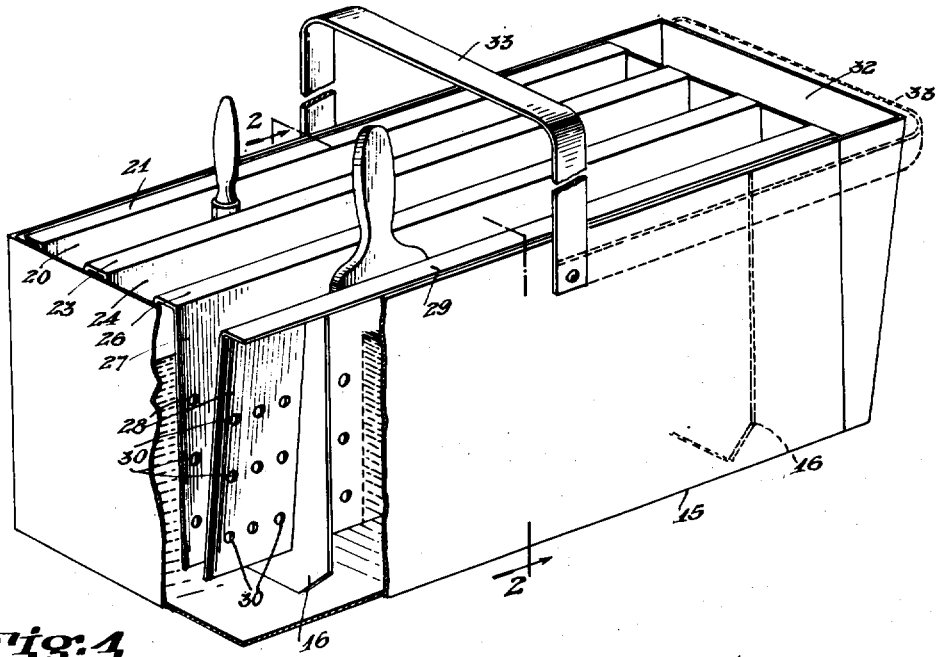
Figure 2:
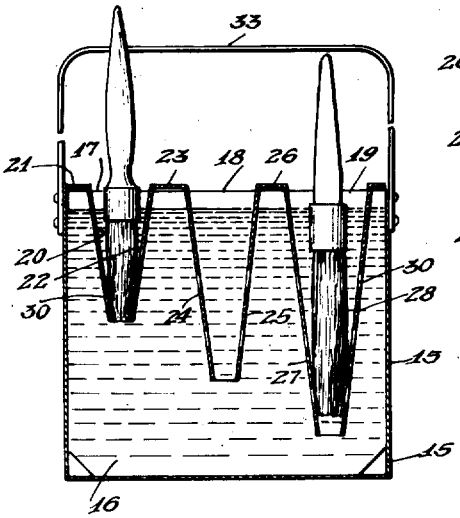
Figure 3:
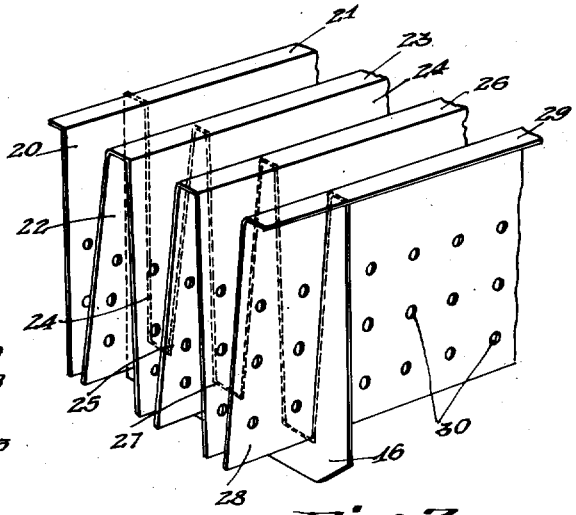

Various other objects of the invention will be apparent from the following particular description, and from an inspection of the accompanying drawing, in which:

Fig. 1 is a perspective view of an embodiment of the invention, parts being broken away to show the construction, Fig. 2 is a transverse sectional view taken approximately on line 2—2 of Fig. 1, and Fig. 3 is a fragmentary perspective view of the partition plates, wiping edges and plate support, the plates showing a modified type in which the several pockets are of a uniform depth.

Referring in greater detail to the drawing, the device is shown to comprise an elongated rectangular container, generally designated by the numeral 15, having a flat bottom and upright sides and ends extending to a suitable height, having level edges.

Fitting within the container are two or more transverse plates 16, in which are spaced downreaching trough-shaped notches 17, 18, and 19, of equal or unequal depth, their opposed edges being straight and convergently inclined to present narrow spaces at the bottoms and relatively wide spaces at the tops.

The height of these plates are substantially uniform with the side walls of the container and their lower corners may be clipped to permit free circulation of the liquid from end to end of the container past the plates, which constitute supports for the brush bristle housing walls.

Fitting against the outer edge of the shallow notch 17 is a plate 20 having a level outturned flange 21 extending to the adjacent side edge of the container wall and resting upon the narrow level top portions of the supports 16. Against the opposite side edges of the notches 17 is an opposed plate 22, bent to produce a narrow level surface 23 and then downwardly to form an inclined plate partition 24, disposed on the adjacent edges of the notches 18 and reaching to their bottoms.

Another plate partition 25 is disposed on the opposite edges to extend upwardly and bent to form a narrow surface 26, and thence angularly downward to contact the adjacent side edges of the notches 19, as at 27.

Similarly another plate partition 28, on the opposite side of the notches 19, is bent at its upper edge to form a surface 29 reaching to the other side wall of the container.

All of the several plate partitions 20—22, 24—25, and 27—28 are provided with a plurality of perforations 30 for the passage of liquid and it is to be noted that the lower edges of each pair of plates are separated by open spaces, while their level tops 21—23—26 and 29, constitute convenient and effective wiping edges for the bristles.

It will now be apparent that the foregoing disposition of parts, which are preferably made of sheet metal, constitute a series of trough-like compartments in which the bristles may soak in whatever liquid may be supplied to the container, maintaining them pliable, slightly compressed in width, and in alinement with the brush handle.

Due to the difference in depth and thickness of several pockets, brushes of variant sizes and thicknesses are readily accommodated, and by reason of the perforations and openings at the bottoms of the compartments, the bristles are effectively maintained in a moistened condition.

In some cases, a transverse end compartment 32 may be formed, the same being in most respects similar to those previously described.

In order to facilitate carrying the device, a handle 33 of conventional design, may be arranged upon the container.

As the open top of the container is overlaid for substantially half its exposed area by the several plates, which constitute in effect a removable cover, evaporation is slow and an additional supply of liquid is easily supplied.

Although the foregoing is descriptive of the best known embodiment of the invention, it will be understood that minor changes and modifications may be resorted to without the exercise of invention and within the spirit and scope of the appended claims.

Having thus described the invention and set forth the manner of its construction and use, what is claimed as new and sought to secure by Letters Patent is:

1. A brush holder comprising a container, a series of plate partitions extending between opposite sides of said container, and forming a plurality of adjoining wedge-shaped pockets with their narrower sections open at all times and disposed at the bottom, and a pair of spaced substantially parallel plates transversely of said partitions, and seated in said container for supporting said partitions into a removable unit, said plates having their size and shape conforming substantially with the cross-sectional size and shape of the container at the sections thereof where said plates are seated, whereby said parallel plates have substantially no play between opposite walls of said container.

2. A brush holder comprising an open-topped rectangular container, a series of plate partitions, extending longitudinally of said container, and forming a plurality of adjoining wedge-shaped pockets wider at the top and open at all times at the bottom, and a pair of transverse plates near opposite ends of said partitions, seated on said container for supporting said partitions into a removable unit, said plates extending into said container substantially at right angles to the opposite side walls of said container with substantially little play transversely of said container between said side walls.

3. A brush holder comprising a rectangular container, and a removable unit in said container including a pair of plate members, each reversely bent to form a pair of substantially flat partitions, converging towards the top and integrally connected at their upper edges by a longitudinal plate section, said plate members forming therebetween a wedge-shaped brush receiving pocket, widest at its top and open at its bottom, a pair of substantially flat plate side partitions on opposite sides of said pair of plate members, forming the sides of said unit, and converging downwardly towards the adjoining partitions of said plate members to form therewith wedge-shaped brush receiving pockets, widest at their tops, and open at all times at their bottoms, said side plate partitions converging downwardly towards each other when said unit is out of said container so as not to interfere with easy entry of said unit in said container, and a pair of plates transversely of said partitions near the opposite ends thereof, and seated in said container for supporting said partitions in said container, said plates extending into said container with substantially little play transversely of said container between opposite side walls thereof.

4. A brush holder comprising a container, a plurality of plate partitions, positioned in said container at an angle to each other and having their bottom edges parallel, means for supporting said partitions alongside of each other in said container in substantially zig-zag relationship, to form a series of brush receiving pockets converging towards the bottom, the lower edges of the partitions defining each pocket being interspaced substantially throughout their length at all times to permit the brushes to pass freely between said edges, and to permit flow of liquid into said pockets through the open bottoms thereof, said support means having means for preventing interspacing of said lower edges beyond a predetermined amount, materially less than the width of the corresponding pockets at the top.

5. A brush holder comprising a container, a plate member positioned in said container and reversely bent to form a pair of partitions, converging towards the top and integrally connected at their upper edges by a longitudinal plate section, a pair of plate partitions on opposite sides of said plate member, and means for uniting said partitions into a removable unit, and for supporting them in said container, with the two partitions of said plate member converging downwardly towards their respective adjoining side partitions to form therewith substantially wedge-shaped brush receiving pockets, the lower edges of the partitions defining each pocket being interspaced at all times to permit the brushes to pass between said edges, and to permit flow of liquid into said pockets through the open bottoms thereof, said support means having means for preventing interspacing of said lower edges beyond a predetermined amount materially less than the width of the corresponding pockets at the top.

6. A brush holder comprising a rectangular container, and a removable unit in said container including a series of plate partitions at an angle to each other, and having their bottom edges parallel, means for supporting said partitions alongside of each other in said container in substantially zig-zag relationship to form a series of brush receiving pockets converging towards the bottom, the lower edges of the partitions defining each pocket being interspaced substantially throughout their length at all times to permit free flow of liquid into said pockets, said supporting means being in substantial contact with the opposite side walls of the container to prevent substantial play of said unit between said walls, the two plate partitions forming the outer sides of said unit being inclined downwardly and inwardly towards each other so as not to interfere with easy entry of said unit in said container.

WALTER C. CRAWFORD.